(12) United States Patent
Pan et al.

(10) Patent No.: US 8,792,212 B1
(45) Date of Patent: Jul. 29, 2014

(54) ROBUST GIMBAL DESIGN FOR HEAD GIMBAL ASSEMBLY

(75) Inventors: Tzong-Shii Pan, San Jose, CA (US); Theerawat Petdee, A. Klongluang (TH)

(73) Assignee: Western Digital (Fremont), LLC, Fremont, CA (US)

( * ) Notice: Subject to any disclaimer, the term of this patent is extended or adjusted under 35 U.S.C. 154(b) by 331 days.

(21) Appl. No.: 12/881,834

(22) Filed: Sep. 14, 2010

(51) Int. Cl.
*G11B 5/48* (2006.01)

(52) U.S. Cl.
USPC ............... 360/245; 360/245.3; 360/245.6; 360/245.9; 360/264.4

(58) Field of Classification Search
USPC ............. 360/245.9, 245, 245.3, 245.6, 264.4
See application file for complete search history.

(56) References Cited

U.S. PATENT DOCUMENTS

| | | |
|---|---|---|
| 5,870,258 A | 2/1999 | Khan et al. |
| 5,883,758 A | 3/1999 | Bennin et al. |
| 5,956,212 A | 9/1999 | Zhu |
| 5,959,807 A | 9/1999 | Jurgenson |
| 6,249,404 B1 | 6/2001 | Doundakov et al. |
| 6,320,730 B1 | 11/2001 | Stefansky et al. |
| 6,351,354 B1 | 2/2002 | Bonin |
| 6,421,211 B1 | 7/2002 | Hawwa et al. |
| 6,459,549 B1 | 10/2002 | Tsuchiya et al. |
| 6,515,832 B1 | 2/2003 | Girard |
| 6,661,619 B2 | 12/2003 | Nishida et al. |
| 6,870,709 B2 | 3/2005 | Shimanouchi et al. |
| 6,965,499 B1 | 11/2005 | Zhang et al. |
| 6,993,824 B2 | 2/2006 | Childers et al. |
| 7,002,780 B2 | 2/2006 | Rancour et al. |
| 7,006,330 B1 | 2/2006 | Subrahmanyam et al. |
| 7,006,331 B1 | 2/2006 | Subrahmanyam et al. |
| 7,023,663 B2 | 4/2006 | Yao et al. |
| 7,113,372 B2 | 9/2006 | Segar et al. |
| 7,159,300 B2 | 1/2007 | Yao et al. |
| 7,301,731 B2 | 11/2007 | Mita et al. |
| 7,345,851 B2 | 3/2008 | Hirano et al. |
| 7,382,583 B2 | 6/2008 | Hirano et al. |
| 7,403,357 B1 | 7/2008 | Williams |
| 7,411,764 B2 | 8/2008 | Yang et al. |
| 7,417,831 B2 | 8/2008 | Yao et al. |
| 7,466,520 B2 | 12/2008 | White et al. |
| 7,471,490 B2 | 12/2008 | Yao |
| 7,474,512 B2 | 1/2009 | Yao et al. |
| 7,525,769 B2 | 4/2009 | Yao et al. |
| 7,535,680 B2 | 5/2009 | Yao et al. |
| 7,538,984 B2 | 5/2009 | Yao |
| 7,545,605 B2 | 6/2009 | Hagiya et al. |
| 7,554,773 B2 | 6/2009 | Zhu et al. |
| 7,567,410 B1 * | 7/2009 | Zhang et al. ............... 360/245.9 |
| 7,593,190 B1 | 9/2009 | Thornton et al. |
| 7,609,487 B2 | 10/2009 | Yao et al. |
| 7,663,843 B2 | 2/2010 | Yao |

(Continued)

*Primary Examiner* — Wayne Young
*Assistant Examiner* — Carlos E Garcia (57) ABSTRACT

Disclosed is a flexure for a head/gimbal assembly suspension for a disk drive. The flexure comprises a metal base layer that includes two outrigger beams and a support island supported by a pair of beams extending from a flexure tongue. The flexure further comprises: a trace layer that is disposed over the base layer that includes a plurality of conductive traces, each conductive trace having a curved section that terminates in a trace termination pad; and a dielectric layer disposed between the trace and base layers including a portion underlying the trace termination pads and overlying the support island. The support island is supported by the pair of beams extending from the flexure tongue and is sized to fully support the trace termination pads of the conductive traces.

24 Claims, 6 Drawing Sheets

(56) References Cited

U.S. PATENT DOCUMENTS

| | | |
|---|---|---|
| 7,688,553 B1 | 3/2010 | Williams et al. |
| 7,697,237 B1 | 4/2010 | Danielson |
| 7,701,675 B2 | 4/2010 | Yao et al. |
| 7,719,798 B2 | 5/2010 | Yao |
| 7,733,607 B2 | 6/2010 | Yao et al. |
| 7,813,082 B2 | 10/2010 | Rice et al. |
| 8,027,128 B2 * | 9/2011 | Muraki et al. ............. 360/245.3 |
| 8,054,585 B2 | 11/2011 | Zeng et al. |
| 8,130,470 B2 * | 3/2012 | Muraki et al. ............. 360/245.3 |
| 8,208,224 B1 | 6/2012 | Teo et al. |
| 8,605,389 B1 | 12/2013 | Pan et al. |
| 2004/0226164 A1 | 11/2004 | Girard |
| 2004/0246625 A1 * | 12/2004 | Tsuchida et al. ........... 360/244.2 |
| 2005/0047019 A1 | 3/2005 | Childers et al. |
| 2005/0117257 A1 | 6/2005 | Thaveeprungsriporn et al. |
| 2006/0262456 A1 | 11/2006 | Wang et al. |
| 2007/0263325 A1 | 11/2007 | Hanya et al. |
| 2008/0030900 A1 | 2/2008 | Zeng et al. |
| 2008/0144223 A1 * | 6/2008 | Muraki et al. ............. 360/244.8 |
| 2008/0144225 A1 | 6/2008 | Yao et al. |
| 2008/0180850 A1 | 7/2008 | Rice et al. |
| 2009/0080116 A1 | 3/2009 | Takahashi et al. |

* cited by examiner

ROBUST GIMBAL DESIGN FOR HEAD GIMBAL ASSEMBLY

BACKGROUND

Disk drives store and retrieve data for digital electronic apparatuses such as computers. A typical magnetic disk drive comprises a head, including a slider and a transducer, in very close proximity to a surface of a rotatable magnetic disk. The transducer, in turn, includes a write element and/or a read element. As the magnetic disk rotates beneath the head, a very thin air bearing is formed between the surface of the magnetic disk and an air bearing surface of the slider. The write element and the read element can be alternately employed to write and read data while an actuator assembly positions the heads along desired magnetic "tracks" on the magnetic disk.

In order to keep the head properly oriented and at the correct height above the disk while in flight, disk drives employ a head gimbal assembly (HGA) that comprises the head and a suspension that further includes a load beam and a flexure that attaches the head to the load beam. The typical flexure is a layered structure that includes a thin metal support, electrical traces, and an insulating layer to keep the electrical traces from contacting the metal support. To electrically connect the head to the electrical traces during assembly, bonding pads of the head's transducer are connected to corresponding termination pads of the electrical traces on the flexure, for example by soldering.

One problem that arises during HGA assembly, when solder is used to connect bonding pads of the transducer to the termination pads on the flexure, is that the solder shrinks as it cools and solidifies. This creates a force that tends to pull the bonding pads and the termination pads towards one another. This force can cause the flexure to distort or solder bonds to fail, or both. A sufficiently distorted flexure may create a large enough pitch static angle (PSA) change in the orientation of the head that, when straightened during assembly, that an unacceptably high residual pitch torque adversely affects the height at which the head flies above the disk. Another problem that occurs is that PSA variation occurs due to different environmental conditions including both temperature and humidity changes.

DETAILED DESCRIPTION

Figure 1:
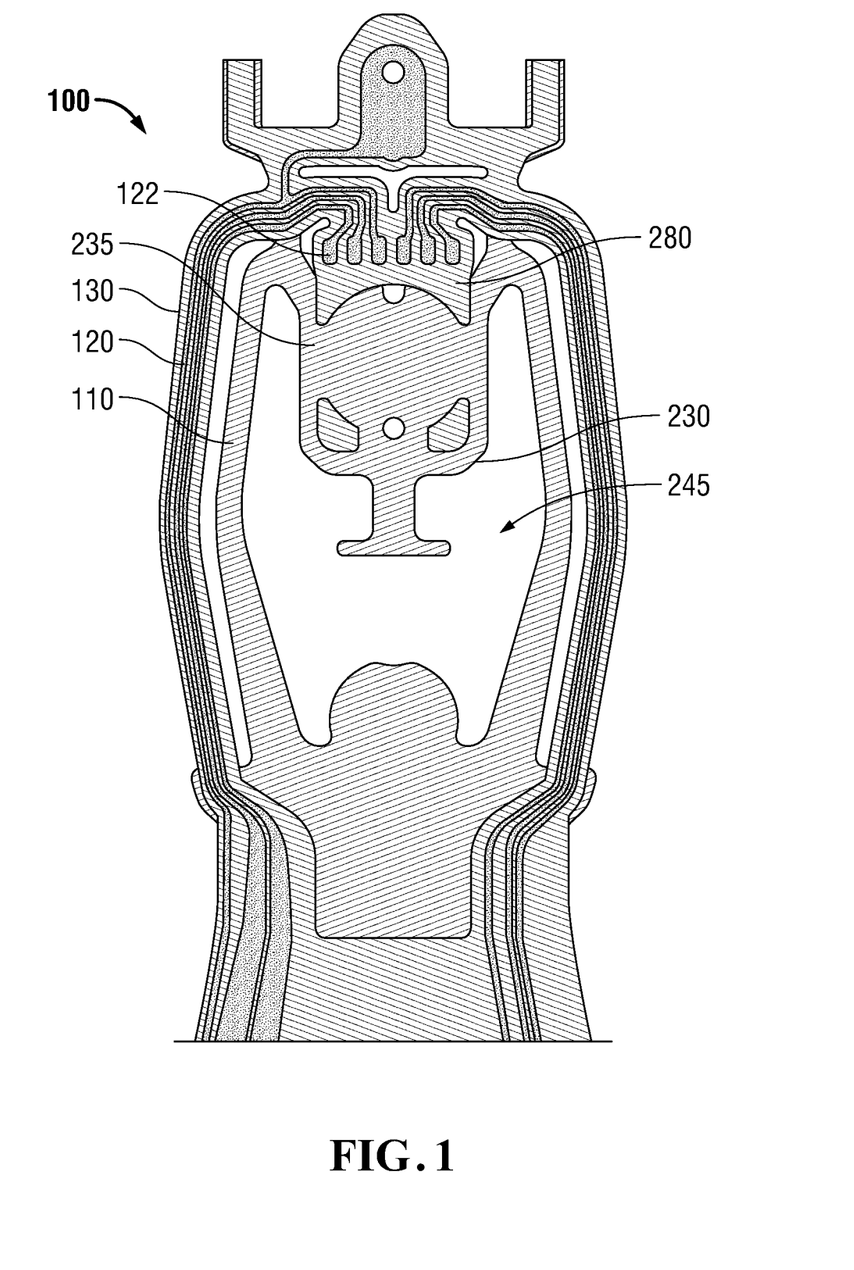
FIG. 1 shows a top view of an exemplary head/gimbal assembly (HGA) suspension according to one embodiment of the invention.

FIG. 1 shows a top view of an exemplary head gimbal assembly (HGA) suspension 100 according to one embodiment of the invention. The HGA suspension 100 comprises four layers, shown side-by-side in FIGS. 2A-2D. In particular, the HGA suspension 100 comprises a metal base layer 110 (FIG. 2A), a trace layer 120 (FIG. 2C) disposed over the base layer 110, a dielectric layer 130 (FIG. 2B) disposed between the trace layer 120 and the base layer 110, and a cover layer 150 (FIG. 2D) that covers the trace layer 120. It should be noted that cover layer 150 is see-through and not shown in FIG. 1. The base layer 110, trace layer 120, dielectric layer 130 and cover layer 150 can be formed by conventional processes know in the art.

Figure 2A:
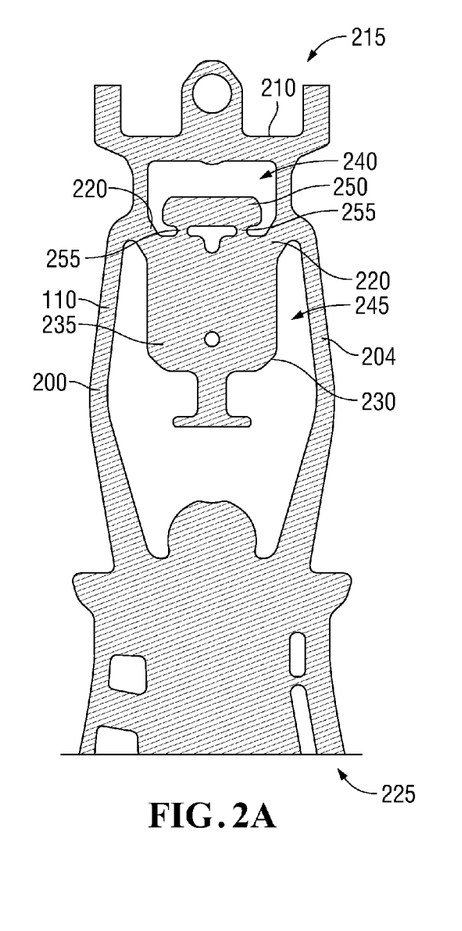
FIG. 2A shows a top view of a metal base layer according to one embodiment of the invention.

With reference also to FIG. 2A, the base layer 110 comprises a metal such as stainless steel. In some embodiments, the thickness of the base layer 110 may be in range of about 10 μm to 25 μm, for example, 20 μm. The base layer 110 may include two outrigger beams 200, 204 and a first cross beam 210 disposed between the two outrigger beams 200, 204 at a trailing end 215 of the flexure 100 and therefore also of base layer 110. The base layer 110 also includes a pair of second angled cross beams 220 extending from the two outrigger beams 200 and 204, respectively. A flexure tongue 230 extends from the pair of second angled cross beams 220 in the direction of the leading end 225. The flexure tongue 230 includes a slider mounting surface 235 for attaching the slider of a head to flexure 100.

The term leading end 225 and trailing end 215, as used herein, are used in conformity with their conventional usage in the art. In their conventional usage, these terms take their meaning from the orientation of the head as secured to the flexure 100. As noted above, the head may comprise a slider and a transducer. The side of the head that includes the transducer is designated as the trailing end of the head. These designations are extended to the flexure 100, and its subcomponents, such that the end of the flexure that attaches to the load beam is the leading end of the flexure 100, while the free end of the flexure 100 is the trailing end of the flexure. In conformity with these terms, as used herein, "towards the leading end" and "towards the trailing end" designate opposing directions in the plane of the flexure 100 along a longitudinal axis thereof (see FIG. 1).

Two windows are defined in the base layer 110. A first approximately U-shaped base layer window 240 is defined between the first cross beam 210, the second pair of angled cross beams 220, and the flexure tongue 230. A second window 245, defined around the flexure tongue 230, separates the flexure tongue 230 from the two outrigger beams 200, 204.

In one embodiment, the base layer 110 includes a support island 250 disposed between the two cross beams 200 and 204 and is located within the first U-shaped base layer window 240. In particular, the support island 250 is supported by a pair of beams 255 extending from the flexure tongue 230. Even more particularly, as will be discussed hereinafter, the support island 255 is sized to fully support the trace termination pads 122 of the conductive traces 120 (see also FIG. 2C). In one embodiment, the support island 250 may act as a heat sink portion to provide a heat sink during the process of forming the electrical interconnect between the trace termination pads and bonding pads of the transducer, such as during soldering.

Figure 2B:
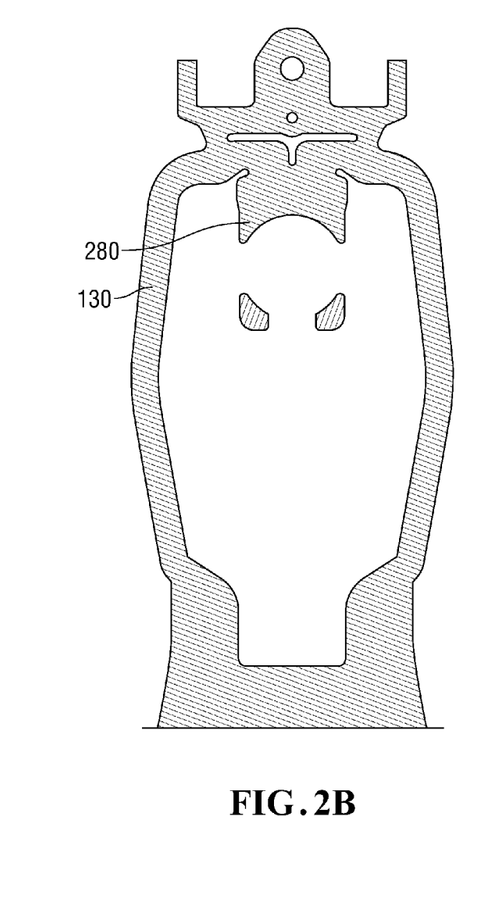
FIG. 2B shows a top view of a dielectric layer according to one embodiment of the invention.
Figure 2C:
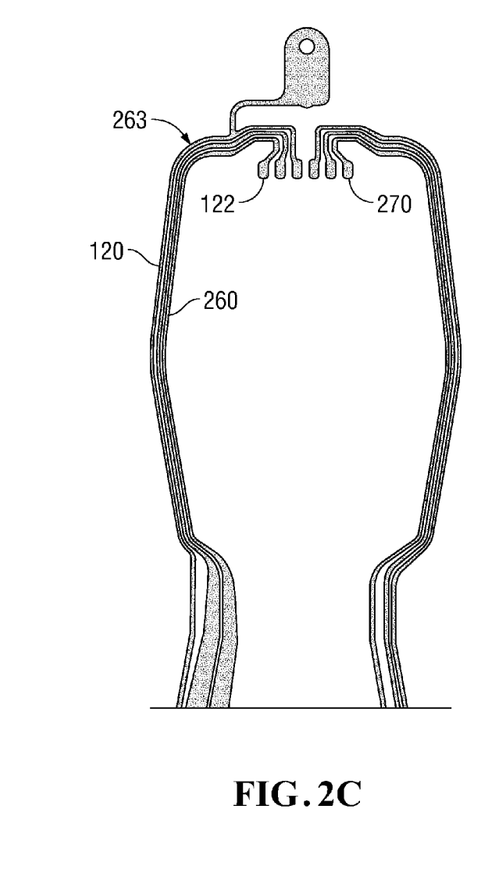
FIG. 2C shows a top view of a trace layer according to one embodiment of the invention.

With reference also to FIG. 2C, the trace layer 120 includes a plurality of conductive traces 260 of a metal such as copper. In some embodiments, a thickness of the trace layer 120 is in the range of about 5 μm to 20 μm, for example, 12 μm. Each conductive trace 260 terminates in a trace termination pad 122, and each trace termination pad 122 has a leading edge 270 disposed closest to the flexure tongue 230.

The trace layer 120 including the plurality of conductive traces 260 is disposed over the base layer 110 and each conductive trace 260 includes a curve section 263 that terminates in a trace termination pad 270. The curve section 253 of each of the conductive traces 260 extends over the U-shaped base layer window 240 of the base layer 110.

With reference also to FIG. 2B, the dielectric layer 130 may be disposed between the trace layer 120 and the base layer 110 and comprises a dielectric material such as a polyimide. In one embodiment, as will be described hereinafter, the dielectric layer 130 may be approximately 5 µm. The dielectric layer 130 includes a portion 280 that both underlies the leading edges 270 of the trace termination pads 122 and also overlays the support island 250, as can be seen in FIGS. 3A-3B.

The portion 280 of the dielectric layer 130 serves to electrically insulate the trace termination pads 122 from the support island 250. Additionally, during the soldering operation that electrically connects bonding pads on a transducer of the head to the conductive traces 260, portion 280 may prevent molten solder from wetting the underside of the trace termination pads 122. Accordingly, in some embodiments, the portion 280 not only underlies the leading edges 270 of the trace termination path 122 but also extends beyond the leading edge 270 as can be seen in FIGS. 1-3.

Figure 2D:
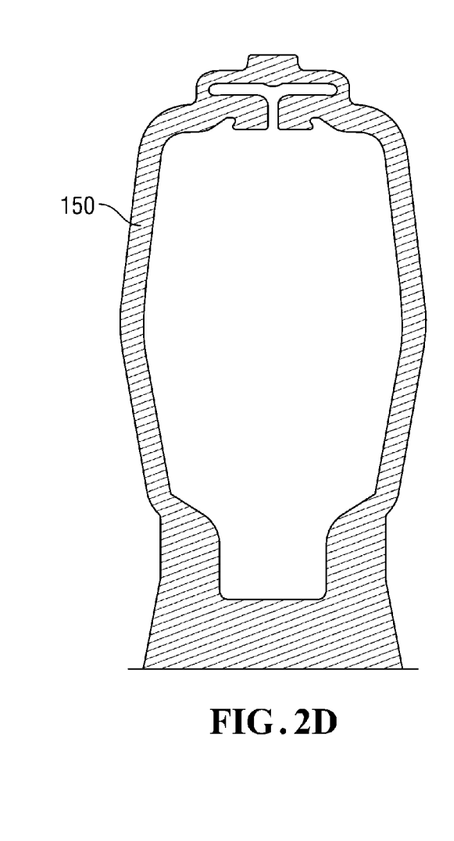
FIG. 2D shows a top view of a cover layer according to one embodiment of the invention.

With reference also to FIG. 2D, a cover layer 150 may be used to cover the trace layer 120. The trace layer 150 is basically see-through and thus cannot be seen in FIGS. 1, 3, and 4. The cover layer 150 may comprise a polyimide.

Figure 3A:
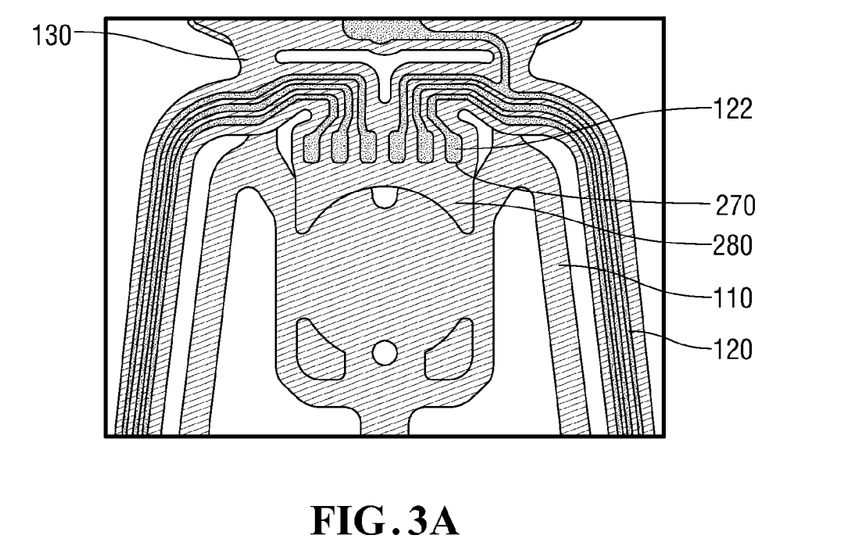
FIG. 3A shows a top view of the flexure according to one embodiment of the invention.
Figure 3B:
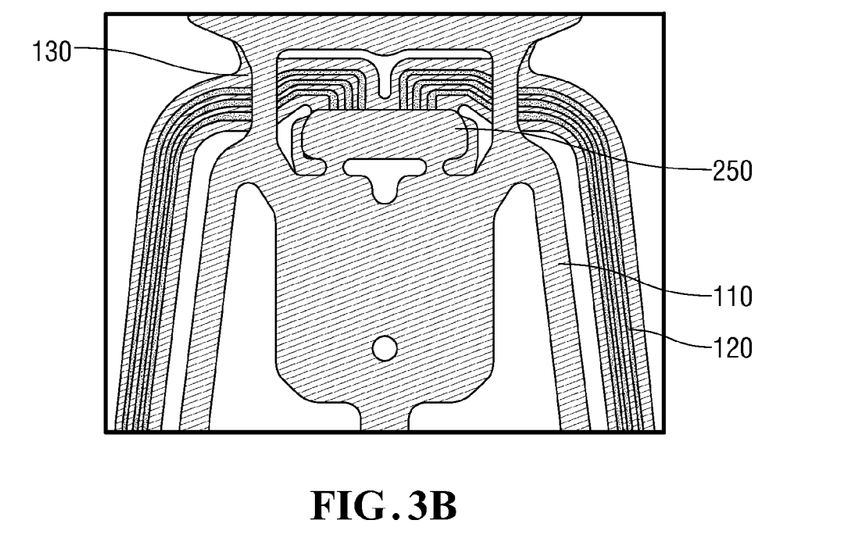
FIG. 3B shows a bottom view of the flexure according to one embodiment of the invention.
Figure 4:
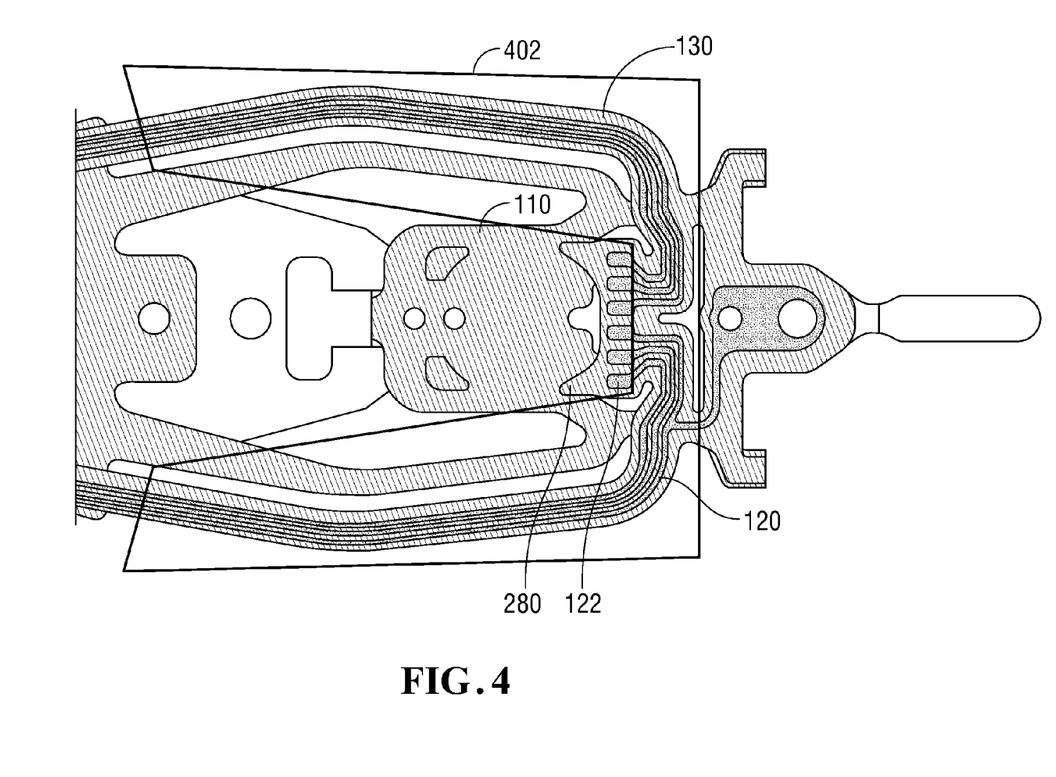
FIG. 4 shows a top view of the flexure illustrating a thinning zone section according to one embodiment of the invention.

With particular reference to FIGS. 3 and 4, in one embodiment, in thinning zone section 401 (see FIG. 4), the thickness of the dielectric layer 103 in the gimbal region approximately matches the thickness of the cover layer 150 in the gimbal region. In one embodiment, the thickness of the dielectric layer 130 may be approximately 5 µm and the thickness of the cover layer 150 may be approximately 5 µm. In one embodiment, the thinning zone section 401 is referred to as the polyimide (PI) thinning zone as these layers are thinned to match one another.

By utilizing this flexure assembly for the HGA suspension assembly as shown in FIGS. 3-4, a partially-isolated stainless steel support island 250 is provided that fully supports the trace termination pads 122 of the conductive traces 120. Further, the thickness of the dielectric layer 103 is configured to match the thickness of the cover layer 150 (e.g., both set at 5 µm) in the thinning zone section 402. This matched thickness of the dielectric layer 130 and cover layer 150 (e.g., both polyimide) balances gimbal distortion due to temperature and humidity during assembly. Further, because of the thinned dielectric layer 130, the trace layer 120 is mover approximately 5 µm closer to the stainless steel metal base layer 110 which further reduces gimbal pitch stiffness.

By utilizing the previously-described flexure for the HGA suspension assembly, pitch static angle (PSA) variation may be minimized through the HGA assembly process including slider bonding, adhesive curing, and solder bonding. In particular, PSA changes may be minimized due to different environmental conditions including both temperature and humidity changes by utilizing this new design. Trace pad isolation at the gimbal slider bond area and the balanced polyimide thickness of the dielectric layer 130 and cover layer 150 helps to achieve these goals.

Figure 5:
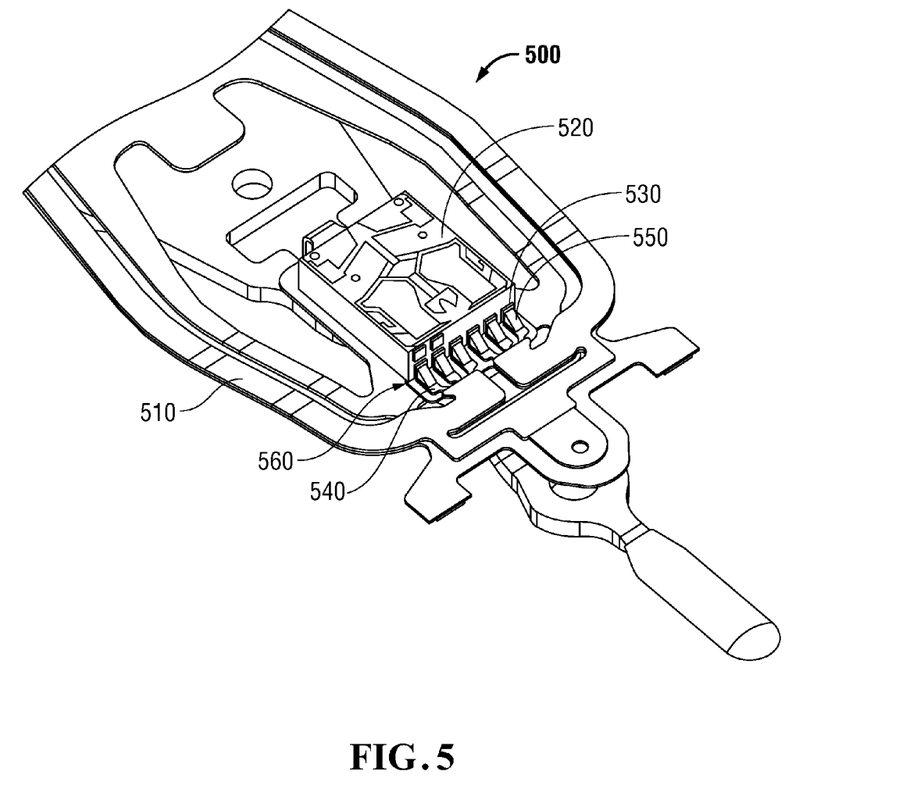
FIG. 5 shows a perspective view of an exemplary head/gimbal assembly according to one embodiment of the invention.

FIG. 5 shows a perspective view of the HGA 500 comprising the head 520 mounted to the HGA suspension 510. The head 520 includes bonding pads 530 that can be electrically connected to trace termination pads 540 by solder balls 550. For simplicity of illustration, the solder balls 550 are represented as wedges, however those skilled in the art will understand that solder balls 550 assume more complex shapes as the wet the surfaces of the bonding pads 530 and the trace termination pads 540.

In some embodiments, the solder balls 550 comprise a solder suitable for use in solder ball bonding (SBB) or solder jet bonding (SJB) processes. Examples include tin-lead solders and lead-free equivalents such as lead-free tin solders. During soldering, a laser melts the solder. As the solder cools and solidifies the solder balls 550 contract, creating a force that pulls the trace termination pads 540 towards the bonding pads 530 on the transducer.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising", "including", and "having", as used herein, are specifically intended to be read as open-ended terms of art.

What is claimed is:

1. A flexure for a head/gimbal assembly suspension comprising:
   a metal base layer including:
      two outrigger beams;
      a first crossbeam disposed between the two outrigger beams at a trailing end of the base layer;
      a pair of second angled crossbeams extending from the two outrigger beams;
      a flexure tongue, including a slider mounting surface, extending from the second angled crossbeams;
      a base layer window disposed between the first crossbeam, the pair of second angled crossbeams, and the flexure tongue; and
      a support island;
   a trace layer disposed over the base layer and including a plurality of conductive traces, each conductive trace having a curved section that terminates in a trace termination pad, each trace termination pad having an edge disposed closest to the flexure tongue, wherein the curved section of each conductive trace extends over the base layer window; and
   a dielectric layer disposed between the trace and base layers including a portion underlying the edges of the trace termination pads and overlying the support island;
   wherein the support island is supported by a pair of beams extending from the flexure tongue and the support island is sized to fully support and completely underlie the trace termination pads of the conductive traces.

2. The flexure of claim 1, wherein the metal base layer comprises stainless steel.

3. The flexure of claim 1, wherein the dielectric layer comprises polyimide.

4. The flexure of claim 1, wherein the trace layer comprises copper.

5. The flexure of claim 1, further comprising a gimbal region and a cover layer, the cover layer to cover the trace layer, wherein the thickness of the dielectric layer in the gimbal region approximately matches the thickness of the cover layer in the gimbal region.

6. The flexure of claim 5, wherein the cover layer comprises polyimide.

7. The flexure of claim 5, wherein the thickness of the dielectric layer is approximately 5 μm.

8. The flexure of claim 5, wherein the thickness of the cover layer is approximately 5 μm.

9. The flexure of claim 1, wherein a center-point of the flexure tongue is disposed further from the first crossbeam than the pair of second angled crossbeams.

10. The flexure of claim 1, wherein an angle of the pair of second angled crossbeams with respect to a longitudinal axis of the flexure is greater than zero degrees.

11. The flexure of claim 1:
wherein the support island comprises a preselected shape having a length and a width; and
wherein a distance between the pair of beams supporting the support island is less than the length of the support island.

12. The flexure of claim 1, wherein the portion of the dielectric layer completely overlies the support island.

13. A head/gimbal assembly comprising:
a flexure including:
a metal base layer having:
two outrigger beams;
a first crossbeam disposed between the two outrigger beams at a trailing end of the base layer;
a pair of second angled crossbeams extending from the two outrigger beams;
a flexure tongue, including a slider mounting surface, extending from the second angled crossbeams;
a base layer window disposed between the first crossbeam, the pair of second angled crossbeams, and the flexure tongue; and
a support island;
a trace layer disposed over the base layer and including a plurality of conductive traces, each conductive trace having a curved section that terminates in a trace termination pad, each trace termination pad having an edge disposed closest to the flexure tongue, wherein the curved section of each conductive trace extends over the base layer window;
a dielectric layer disposed between the trace and base layers including a portion underlying the edges of the trace termination pads and overlying the support island;
wherein the support island is supported by a pair of beams extending from the flexure tongue and the support island is sized to fully support and completely underlie the trace termination pads of the conductive traces; and
a head including a slider mounted on the flexure tongue and a transducer having bonding pads, each bonding pad soldered to a respective trace termination pad by a solder ball.

14. The head/gimbal assembly of claim 13, wherein the metal base layer comprises stainless steel.

15. The head/gimbal assembly of claim 13, wherein the dielectric layer comprises polyimide.

16. The head/gimbal assembly of claim 13, wherein the trace layer comprises copper.

17. The head/gimbal assembly of claim 13, further comprising a gimbal region and a cover layer, the cover layer to cover the trace layer, wherein the thickness of the dielectric layer in the gimbal region approximately matches the thickness of the cover layer in the gimbal region.

18. The head/gimbal assembly of claim 17, wherein the cover layer comprises polyimide.

19. The head/gimbal assembly of claim 17, wherein the thickness of the dielectric layer is approximately 5 μm.

20. The head/gimbal assembly of claim 17, wherein the thickness of the cover layer is approximately 5 μm.

21. The head/gimbal assembly of claim 13, wherein a center-point of the flexure tongue is disposed further from the first crossbeam than the pair of second angled crossbeams.

22. The head/gimbal assembly of claim 13, wherein an angle of the pair of second angled crossbeams with respect to a longitudinal axis of the flexure is greater than zero degrees.

23. The head/gimbal assembly of claim 13:
wherein the support island comprises a preselected shape having a length and a width; and
wherein a distance between the pair of beams supporting the support island is less than the length of the support island.

24. The head/gimbal assembly of claim 13, wherein the portion of the dielectric layer completely overlies the support island.

* * * * *